Aug. 12, 1930.  M. J. HATFIELD ET AL  1,772,938
HYDRAULIC JACKING SYSTEM
Filed March 6, 1929  2 Sheets-Sheet 2

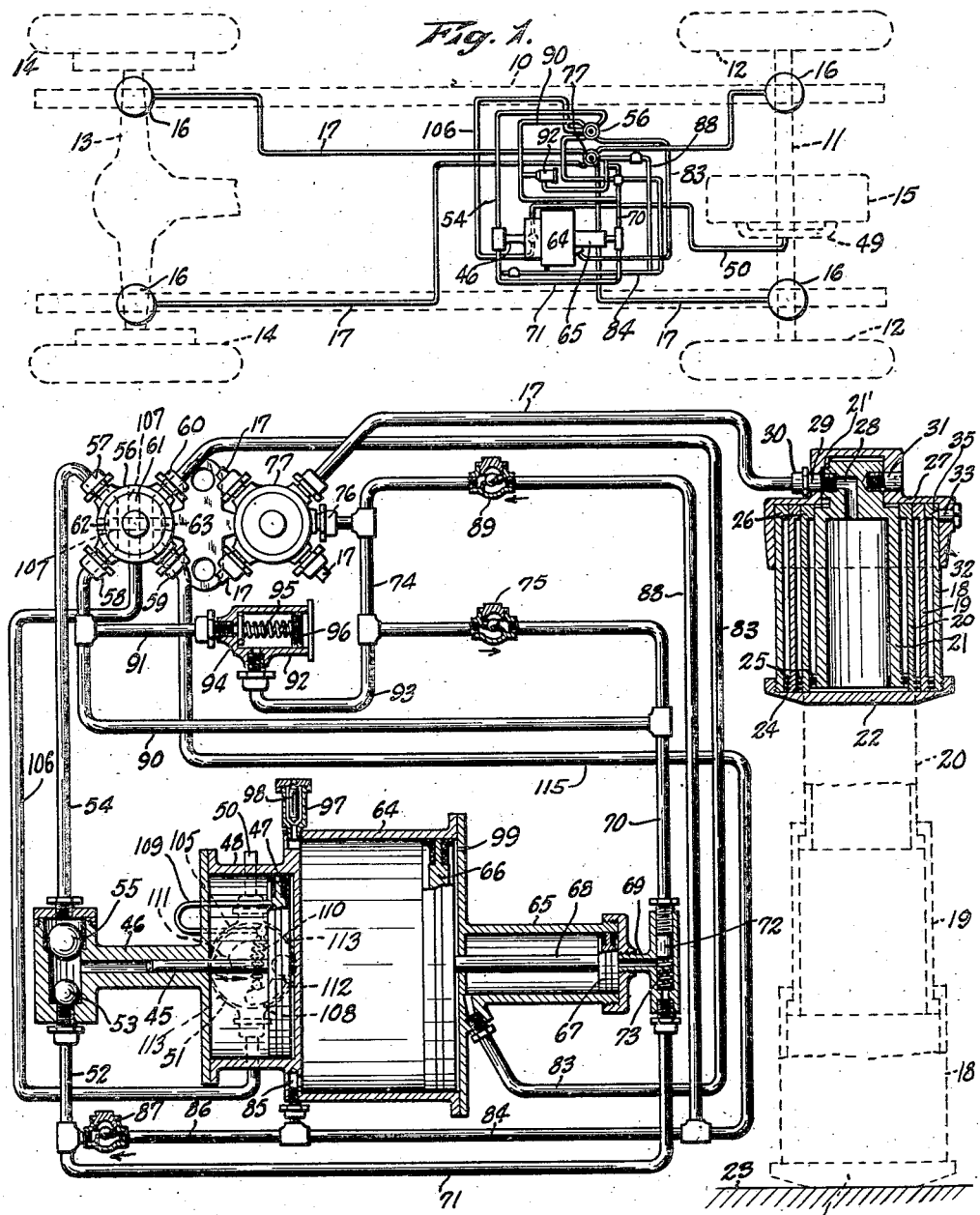

Inventors
Maurice J. Hatfield
and Elmer W. Crabbe
By Wooster & Davis
Attorneys

Patented Aug. 12, 1930

1,772,938

UNITED STATES PATENT OFFICE

MAURICE J. HATFIELD AND ELMER W. CRABBE, OF BRIDGEPORT, CONNECTICUT, ASSIGNORS TO THE HATFIELD-CRABBE COMPANY, OF BRIDGEPORT, CONNECTICUT, A CORPORATION OF CONNECTICUT

HYDRAULIC JACKING SYSTEM

Application filed March 6, 1929. Serial No. 344,670.

This invention relates to jacks for automobiles and has for an object to provide a jacking system which may be applied to an automobile as a permanent part of its equipment and may be used by the operator without leaving his driving position to quickly raise any one of the wheels of the car from the ground.

In this system there is a jack for each wheel of the car secured to the axle adjacent the wheel, and in normal running position of the car each individual jack is retracted to provide the required clearance above the road.

In ordinary jacking systems considerable time is required in extending the jack to the lifting position when it is doing no work and the same is true in retracting or lifting the jack to the normal inoperative running position after the car has been lowered.

It is, therefore, an object of the present invention to provide an operating means for the jack in which the speed of the jack is greatly increased over the old construction in shifting it from the normal inoperative to the lifting position or retracting the same, and thus reduce the time required in jacking up a wheel of the car and again getting the jack into its normally retracted position.

It is also an object of the invention to provide a jacking system in which the jacks may be operated at as great or greater speed than the old systems with a smaller motor and pump.

It is also an object of the invention to provide a jacking system in which small leaks will not cause trouble in the operation of the jacks.

With the foregoing and other objects in view, the invention consists in certain novel features of construction, combinations and arrangements of parts as will be more fully disclosed in connection with the accompanying drawings. In these drawings, Fig. 1 shows in dotted outline the chassis and wheels of a car and our jacking system in full lines shown somewhat diagrammatically applied thereto.

Fig. 2 is a diagrammatic view of the jacking system with certain parts in section to more clearly indicate the construction.

Figure 6:
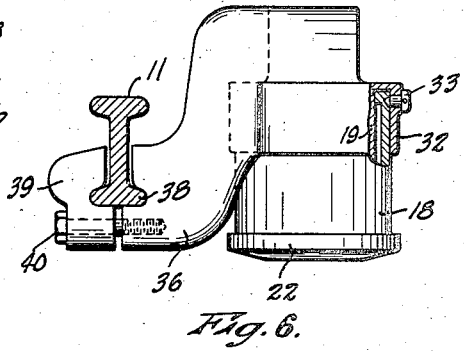
Fig. 6 is a side elevation thereof with a portion broken away to more clearly show the construction.
Figure 3:
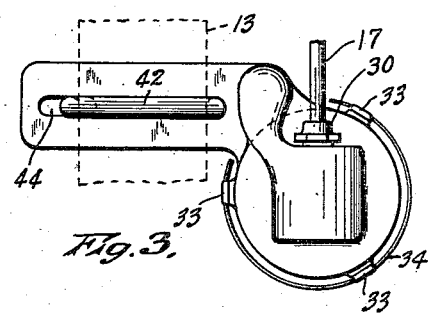
Fig. 3 is a top plan view of one of the jacks and the bracket for securing it to a rear spring.
Figure 4:
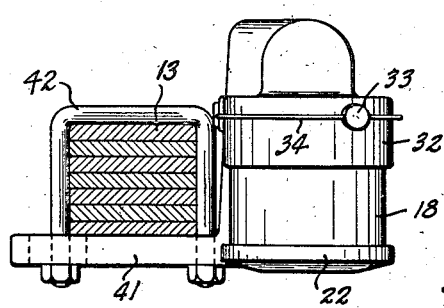
Fig. 4 is a side elevation thereof.

Referring to Fig. 1 the side frames of the chassis are indicated at 10, front axle at 11, front wheels at 12, rear axle 13, rear wheels at 14, and the motor is indicated at 15. The system as applied consists of four jacks 16, one for each wheel so that any individual wheel may be raised as desired with a pipe 17 running to each jack. The jacks are all of the same construction and all operate in the same way, the preferred form of jack being shown in section in Fig. 2. This jack is made of a plurality of telescoping sections 18, 19, 20 and 21, the lower section 18 being the largest and being closed at its lower end by the head 22 which is adapted to rest on the road or floor 23 when lifting the car. The jack sections are slidable relative to each other and are connected by packed joints 24 to prevent leakage, and have cooperating flanges 25 and 26 to limit their movements outwardly and prevent separation under the action of the fluid pressure. The top and smallest section 21 is stationary in that it is not extended in the operation of the jack but is preferably pivoted in the bracket or casing 27 to permit sufficient movement for the jack to rest properly on a support during the jacking up of the car. The head or closed end of the section 21 is provided with a fluid passage 28 for entrance and exit of fluid to the interior of the jack. A convenient means for mounting is to pass a nipple 29 through the wall of the casing or bracket 27 and thread it into a boss 21' on the section 21 and connect the pipe 17 to this nipple by any suitable type of connection 30. A pin 31 is secured in the section 21 diametrically opposite the nipple 29 and passes through an opening in the casing. The boss 21' seats at the top of a recess in the member 27 and open at its lower side so the boss can be inserted from below. Therefore, the boss 21' and pin 31 form a pivotal connection between the section 21 and the bracket 27 and permit limited swinging movement of the jack. The bracket 27 has downwardly extending cylindrical walls 32 which enclose the upper portion of the section 18 when the jack is retracted, as indicated in Fig. 6, and is provided with yieldable means for retaining the jack in this position, such as one or more slidable pins 33 in the side wall thereof held normally therein by a spring 34 which may be a spring wire passing through openings in the pins. The pins have tapered ends seated in notches 35 in the outer wall of the section 18, and thus yieldably retain the jack in the lifted or retracted position although it is also held in this position by suction, as will later be described. The casing 27 has an arm 36 by means of which it may be secured to the front axle 11, this arm being notched to receive the flange 38 of the axle and a block 39 having a similar notch for the other side of the axle is clamped to the arm 36 by one or more screws 40. For the rear axle the casing is the same but the mounting arm is different. A construction found to be satisfactory is shown in Figs. 3 and 4. In this arrangement the casing is provided with a rearward extending arm 41 and a U-shaped clamping bolt 42 passes around the spring 13 and through suitable openings 44 in the arm 41. One of these openings 44 may be elongated to permit adjustment for different sized springs.

Figure 7:
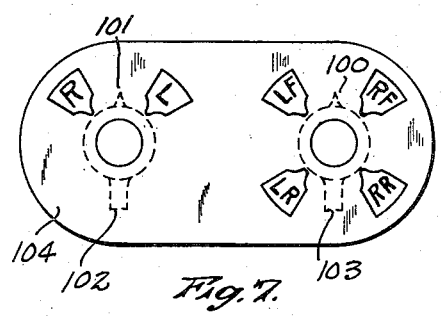
Fig. 7 is a front elevation of the control plate on the floor of the car.
Figure 5:
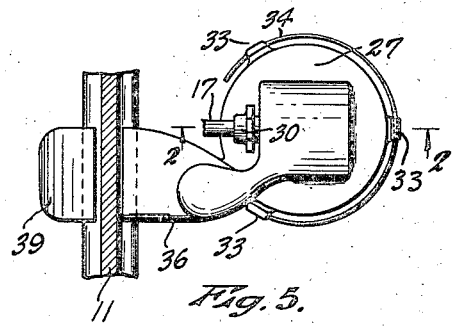
Fig. 5 is a top plan view of a jack and bracket for securing it to a front axle.

The operating system is shown in Fig. 2. It includes a suitable source of fluid pressure supply such, for example, as a pump having a reciprocating plunger which is shown at 45 in the cylinder 46. This pump is operated by any suitable power means, such as a motor either electrical or fluid operated, the motor shown being operated by suction from the engine 15. It comprises a piston 47 connected to the plunger 45 reciprocating in the cylinder 48, the opposite sides of this piston being alternately connected to the atmosphere and the intake manifold 49 of the engine through a pipe 50 by means of an oscillating valve 51, this valve being oscillated in opposite directions to make these connections by the piston at the opposite ends of its movement. This motor has a valve casing 105 having separated chambers one of which communicates with the intake manifold through pipe 50 and the other communicates with a pipe 106 leading to the control valve 56. The plug 61 of this valve has two transverse passages 107 which are so arranged that when the valve is in either one of the positions for raising or lowering the jacks, that is with the pointer 101 at R or L, one of these passages form a communication from pipe 106 with the atmosphere, thus permitting the suction motor to function to operate the pump. When the control valve is in the neutral position, that is with pointer 101 in position of Fig. 7, this communication of pipe 106 with the atmosphere is cut off preventing the motor operating. In the valve casing 105 is an oscillating valve disc 113 having curved passages 108 forming communication from the pipes 50 and 106 alternately with the cylinder 48 on opposite sides of the piston 47. This valve is oscillated in opposite directions with a snap action by the piston 47 at the limits of its stroke. A rod 109 connected to the piston 47 passes out of the cylinder and is connected by a spring 110 with the valve, one end of the spring being connected to this rod and the other end to the valve. As the piston reciprocates the rod 109 swings the spring past the center of the valve at which point the spring functions to shift the valve with a quick action and reverse the connections from the opposite sides of the piston with the pipes 50 and 106 through the openings 111 and 112 in the cylinder leading to the opposite sides of the piston and the passages 108 in the valve. It will, of course, be understood any suitable type of motor may be used. The inlet to the pump is shown at 52 with a check valve 53 to prevent backward movement of the liquid and the discharge pipe is shown at 54 also controlled by a check valve 55. The discharge pipe 54 leads to a control valve 56 through the inlet 57. This control valve also has three other branches 58, 59 and 60 which are controlled by the rotatable plug 61 having the transverse passages 62 and 63.

Figure 8:
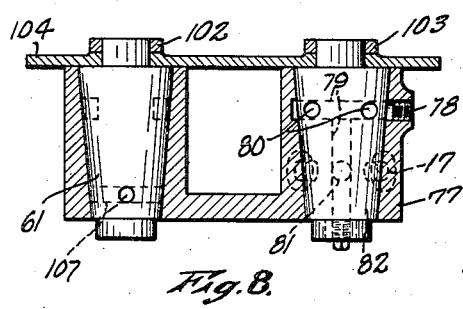
Fig. 8 is a longitudinal section through the control valves but showing them more or less diagrammatically.

The operating system also includes a pair of cylinders of different diameters, the larger cylinder being indicated at 64 and the smaller cylinder at 65, and for convenience of construction they are preferably in the same unit structure. There is a piston 66 in the larger cylinder and another piston 67 in the smaller cylinder, the two pistons being connected by the rod 68 so that they move together. As shown in the drawing, the right hand end of the cylinder 65 is connected through the connections 69 with a pipe 70 and also with a pipe 71 with a sliding valve 72 between them, the valve being normally held to close the pipe 70 by the light spring 73, which spring, however, under certain conditions permits the valve 72 to be forced downwardly to form communication between the pipe 70 and the branch connection 69. The pipe 71 is connected to the suction or inlet pipe 52 of the pump while the pipe 70 is connected to a pipe 74 through a check valve 75 which will permit flow from the pipe 74 but will prevent flow from the pipe 70 to pipe 74. Pipe 74 leads through a branch 76 to the distributing valve 77 by means of which the pipe 76 may be connected to any one of the four jacks 16 depending on which one it is desired to operate. As shown in Fig. 8, branch 76 is connected to the casing of the valve 77 at 78 and with a groove 79 which leads to the passages 80 to an outlet passage 81 which may be brought into alignment with any of the distributor pipes 17 by turning the valve plug 82.

The other end of the smaller cylinder 65 on the opposite side of the piston 67 is connected by a pipe 83 with the branch 60 of the control valve 56 while the left hand end of the larger cylinder 64 is connected by a pipe 84 with the branch 59 of the control valve, the connection to the cylinder being shown at 85. The pipe 84 is also connected by a branch 86 to the intake pipe 52 of the pump through a check valve 87 which permits flow from the pipe 86 to the pipe 52 but prevents flow in the opposite direction. The pipe 84 is also connected by a branch pipe 88 with the pipe 74 and nipple 76 through a check valve 89 which permits flow from the pipe 88 to the branch 76 and pipe 74 but prevents flow in the opposite direction. Leading from the branch connection 58 of the control valve 56 is a pipe 90 connected to the pipe 70 and leading from the pipe 90 is a branch pipe 91 leading to a pressure control and release valve 92 which has a discharge connection 93 to the pipe 74. In this valve 92 is an opening leading to the pipe 91 and controlled by a valve member 94 with a spring 95 tending to hold it in the closed position. An adjustable plug 96 is threaded in the casing 92 and is adjustable to vary the pressure of spring 95. The pipe 93 communicates with the casing 92 to the right of the valve 94 when in its closed position. An air release valve 97 is connected to the upper part of the cylinder 64 to permit escape of any air which may be trapped in the cylinder, the outlet opening being controlled by an automatic float valve 98 which will permit escape of air but will prevent escape of liquid. There is also an opening 99 forming communication with the space at the opposite side of the piston 66 with the atmosphere.

The operation is as follows: Assuming that the system is filled with the proper liquid such, for example, as oil, when the operator wishes to jack up any one of the four wheels he turns the plug 82 of the distributor valve 77 to connect the inlet 76 with the distributor pipe 17 leading to the proper jack. This is determined by a pointer 100 secured to the plug 82 and movable therewith. When this pointer is over any one of the indications LF, RF, RR, or LR, the corresponding jack will be operated, LF meaning the left front jack, RF the right front and so on. The control valve 56 determines whether the jack is to be expanded to raise the corresponding wheel of the vehicle or to be retracted to lower the wheel and the jack raised to the inoperative position. A pointer 101 on the movable plug 61 moving over the plate 104 determines whether the operation is to be the expanding or contracting of the jack. These plugs may be operated by any suitable means, such as keys or handles 102, 103. Supposing now the operator wishes to raise one of the wheels he turns the plug 82 of the distributor valve to the proper position for the jack desired. He then turns the plug 61 of the control valve 56 so that the pointer 101 indicates the raising position (R) which is the position of Fig. 2 with the passage 62 connecting the branches 57 and 58 and the passage 63 connecting the branches 59 and 60. This movement of the valve plug 61 places one of the passages 107 in alignment with the pipe 106 to the pump motor and forms a communication from the atmosphere to this pipe and thus permits the motor to start and operate the pump 45 which creates a pressure in the pipe 54 and which pressure is transmitted through the passage 62 to the pipe 90 and pipe 70. This pressure forces down the valve 72 to a position below the passage in the branch 69 so that fluid is then pumped directly from the pump through this passage 69 into the smaller cylinder 65 to the right hand side of the piston 67. This forces the piston 67 to the left carrying with it the larger piston 66. This movement forces the liquid in the cylinder 64 through the outlet 85 into the pipe 84 and through the pipe 88, branch 76 to the distributor valve 77 and from this valve through the distributing pipe 17 to the jack which, of course, at that time is in the raised or retracted position. It, of course, requires only a low pressure to move the jacks from their raised position to the position where they first engage the road or floor 23, and as the piston 66 is much larger than the piston 67 the relatively small amount of liquid supplied by the pump 46 to the cylinder 65 will supply a relatively large amount of liquid from the cylinder 64 to the jack and shift it to the extended position preparatory to raising the vehicle. It will, therefore, be apparent that with this device the jack is extended preparatory to raising the vehicle in a much shorter time than it would be if only the liquid supply from the pump was led directly to the jack. During this time the pressure of the liquid throughout the system has been relatively low, but as soon as the lower end of the jack engages the support 23 further movement will necessitate raising the car and this requires considerably greater pressure. Therefore, the pressure in the outlet from the pump rises and forces the valve 94 from its seat permitting liquid to flow under high pressure directly from the pump through the pipes 93 and 74 and branch 76 to the distributor valve and the distributor pipe 17 leading to the jack. Therefore, during the actual raising of the vehicle liquid under high pressure is pumped directly from the pump to the jack. During the preliminary expansion of the jack, that is during the movement of the pistons 67 and 66, the liquid in the cylinder 65 at the left hand side of the piston 67 may also be conducted to the jack through the pipe 83 to branch 60 of the control valve and through the passage 63 and pipe 115 to the pipes 84 and 88. This liquid is, therefore, also carried to the jack and assists in expanding it. Sufficient liquid is supplied to the inlet side of the pump through the pipe 86 and the check valve 87 and as this liquid is under pressure it insures that the pump cylinder is filled with liquid at each stroke, which is important as the pump thus works at its full capacity instead of with only partly filled cylinder as is often the case where suction alone is relied on to draw liquid into the pump cylinder. After the jack is fully expanded and the vehicle, therefore, raised, pressure of the liquid will become sufficiently high to merely stop the motor 48, or some automatic pressure stop may be employed if desired, but with this type of motor an automatic stop is unnecessary.

In lowering the vehicle and returning the jack to its raised position the operator merely turns the valve plug 61 a quarter revolution to the right. This brings the passage 62 to a position to form communication between the branches 57 and 60 while the passage 63 forms communication between the branches 58 and 59. Now operation of the pump 46 will force liquid through the pipe 83 to the cylinder 65 on the left hand side of the piston 67. This will force this piston to the right and shift with it the piston 66. The space to the left of this piston is now in communication with the jack through the passage 85, pipe 84, pipe 115, passage 63 in the control valve, pipe 90, check valve 75, pipe 74, branch 76 of the valve 77 and distributor pipe 17. The large capacity of the cylinder 64 draws the liquid rapidly from the jack and quickly lowers the vehicle and raises the jack to its upper or inoperative position, and it will be obvious that due to the large capacity of the cylinder 64 and the large piston 66 the liquid will be much more rapidly and positively withdrawn from the jack and the jack will be much more rapidly retracted than it would be if the relatively small capacity of the pump 46 were relied on as the only means for withdrawing the liquid from the jack. During this return movement of the piston 67 the plug 72 is held in its upper position by the spring 73 and the pressure from the right hand side of the piston 67, and therefore, the liquid on the right hand side of the piston 67 is carried to the suction side of the pump through the pipe 71. Liquid from this pipe cannot be drawn into the pipe 86 because of the check valve 87. Also air cannot be drawn into the cylinder 64 through the escape vent 97 because the valve 98 is drawn downwardly and closes the passage to the cylinder at the lower end of the casing 97. The pressure at which the valve 94 will yield is determined by adjusting the plug 96, and therefore, the pressure of the spring 95.

It will be apparent from the foregoing description that with this device considerable time is saved in the expanding and contracting of the jack over what would be required if the liquid from the pump only was always led directly to the jack or if the capacity of the pump only were used to retract the jack, and therefore, for the same operation a much smaller pump may be used, and with a much smaller pump a much quicker operation of the jack is secured. Still further with this device small leaks in the system are not troublesome as they would be with a pump of small capacity discharging only directly to the jack. In other words with this construction we can do the same thing in less time and more satisfactorily with a smaller pump and smaller motor than we could with only direct operation of the jacks from the pump.

Having thus set forth the nature of our invention, what we claim is:

1. In combination, a jack, means for securing the jack to a vehicle for raising it, and means for operating the jack including a fluid pressure supply means, a pair of cylinders of different diameters, connected pistons in said cylinders, a connection from the smaller cylinder to the fluid pressure supply to operate the pistons, a connection from the larger cylinder to the jack to supply pressure thereto to extend the jack to lifting position, and means to automatically connect the jacks to the fluid pressure supply when it reaches lifting position.

2. In combination, a jack, means for securing the jack to a vehicle for raising it, and operating means for the jack including a fluid pressure supply means, means operated by pressure from said supply means to feed a relatively large amount of fluid to the jack at a lower pressure than the supply to extend the jack with a rapid movement to the lifting position, and means for automatically feeding fluid at the higher pressure of the supply to the jack after it reaches the lifting position.

3. In combination, a jack, means for securing the jack to a vehicle for raising it, a pair of cylinders of different diameters, connected pistons in the cylinders, a pump, a discharge connection from the pump to the smaller cylinder, a discharge connection from the larger cylinder to the jack, and means to automatically connect the discharge from the pump to the jack when the pressure reaches a given amount.

4. In combination, a jack, means for securing the jack to a vehicle for raising it, a pair of cylinders of different diameters, connected pistons in the cylinders, a liquid pump, a control valve, a discharge pipe from the pump to said valve, delivery pipes from the valve to each side of the smaller piston, a connection from the larger cylinder to the jack, and means in the valve to connect the discharge from the pump with either end of the smaller cylinder.

5. In combination, a jack, means for securing the jack to a vehicle for raising it, a pump, a movable member for forcing liquid under pressure to the jack, and means operated by the pump for operating said member.

6. In combination, a jack, means for securing the jack to a vehicle for raising it, a pump, means for forcing liquid under pressure to the jack, means operated by the pump for operating said latter means, and means for automatically connecting the discharge from the pump with the jack when the pressure reaches a given amount.

7. In combination, a jack, means for securing the jack to a vehicle for raising it, means for normally holding the jack raised above the road, a pump, and means operated by the pump for supplying liquid to the jack at a greater rate than the capacity of the pump to move the jack to engagement with the road.

8. In combination, a jack, means for securing the jack to a vehicle for raising it, means for normally holding the jack raised above the road, a pump, means operated by the pump for supplying liquid to the jack at a greater rate than the capacity of the pump to move the jack to engagement with the road, and means for automatically connecting the discharge from the pump with the jack after the jack engages the road.

9. In combination, a jack, means for securing the jack to a vehicle for raising it, a pair of cylinders of different diameters, connected pistons in said cylinders, a pump, a discharge connection from the pump to the smaller cylinder at one side of its piston to shift said piston, a connection from said cylinder at the other side of said piston to the jack, and a connection from the larger cylinder to the jack to force liquid to the jack upon operation of the larger piston by the smaller piston.

10. In combination, a jack, means for securing the jack to a vehicle for raising it, a pair of cylinders of different diameters, connected pistons in said cylinders, a control valve, a pump, a discharge pipe from the pump to the valve, connections from the valve to opposite sides of the smaller piston, said valve including means to connect the discharge from the pump to either side of the smaller piston, a discharge connection from the larger cylinder to the jack, and means to automatically connect the discharge from the pump to the jack when the pressure reaches a given amount.

11. In combination, a jack, means for securing the jack to a motor vehicle for raising it, a pump for operating the jack, a suction motor for operating the pump and connected with the intake manifold of the vehicle motor, a control valve between the pump and the jack for determining the operation of the jack, and means operated by said valve to control the operation of the suction motor.

12. In combination, a jack, means for securing the jack to a motor vehicle for raising it, a pump for operating the jack, a suction motor for operating the pump, means for connecting the suction motor with the intake manifold of the vehicle motor, a control valve, connections from the pump and the jack with said valve whereby said valve controls the operation of the jack, and a connection from the suction motor with said valve, said valve having passages to connect said latter connection with the atmosphere when the valve is in position to place the pump in communication with the jack.

In testimony whereof we affix our signatures.

MAURICE J. HATFIELD.
ELMER W. CRABBE.